(No Model.) 2 Sheets—Sheet 1.

J. RAWLE.
UNICYCLE.

No. 482,100. Patented Sept. 6, 1892.

Witnesses:
Louis M. F. Whitehead.
J. B. Weir.

Inventor:
John Rawle
by Dayton, Poole & Brown
his Attorneys.

(No Model.) 2 Sheets—Sheet 2.
J. RAWLE.
UNICYCLE.
No. 482,100. Patented Sept. 6, 1892.
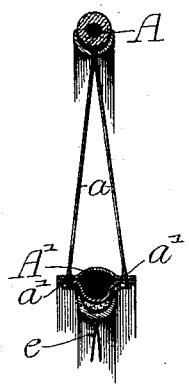
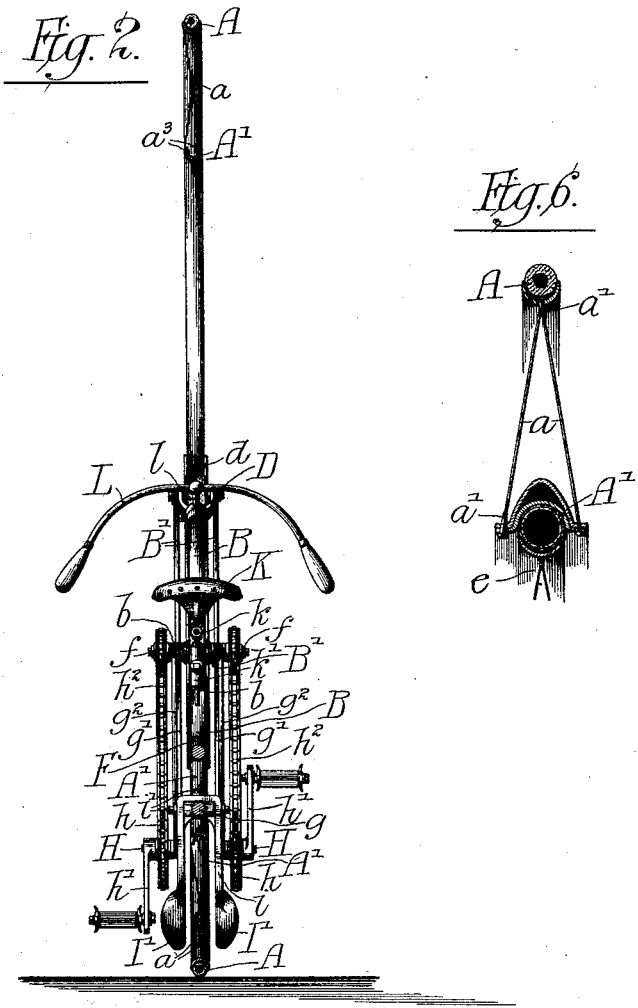
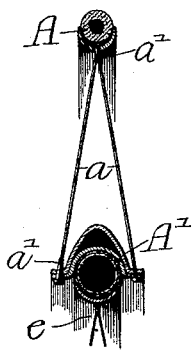
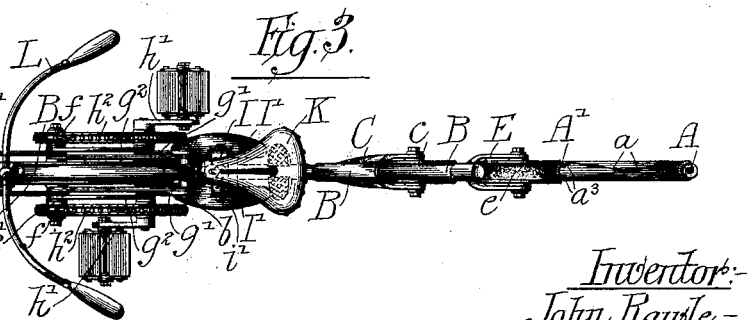

UNITED STATES PATENT OFFICE.

JOHN RAWLE, OF CHICAGO, ILLINOIS.

UNICYCLE.

SPECIFICATION forming part of Letters Patent No. 482,100, dated September 6, 1892.

Application filed August 30, 1891. Serial No. 404,333. (No model.)

*To all whom it may concern:*

Be it known that I, JOHN RAWLE, a citizen of the United States, and a resident of Chicago, in the county of Cook and State of Illinois, have invented certain new and useful Improvements in Unicycles; and I do hereby declare that the following is a full, clear, and exact description thereof, reference being had to the accompanying drawings, and to the letters of reference marked thereon, which form a part of this specification.

The object of this invention is to improve the construction and operation of that class of unicycles embodying a continuous circular rim, in which is mounted a frame which supports the rider and which carries the operating mechanism.

My improvements relate to the construction of the rim or endless track within and upon which the driving mechanism operates, and also to the construction of said driving mechanism and the arrangement and location of the latter with respect to the former.

My invention consists in the matters which will be fully described in the following specification and pointed out in the claims.

Figure 1:
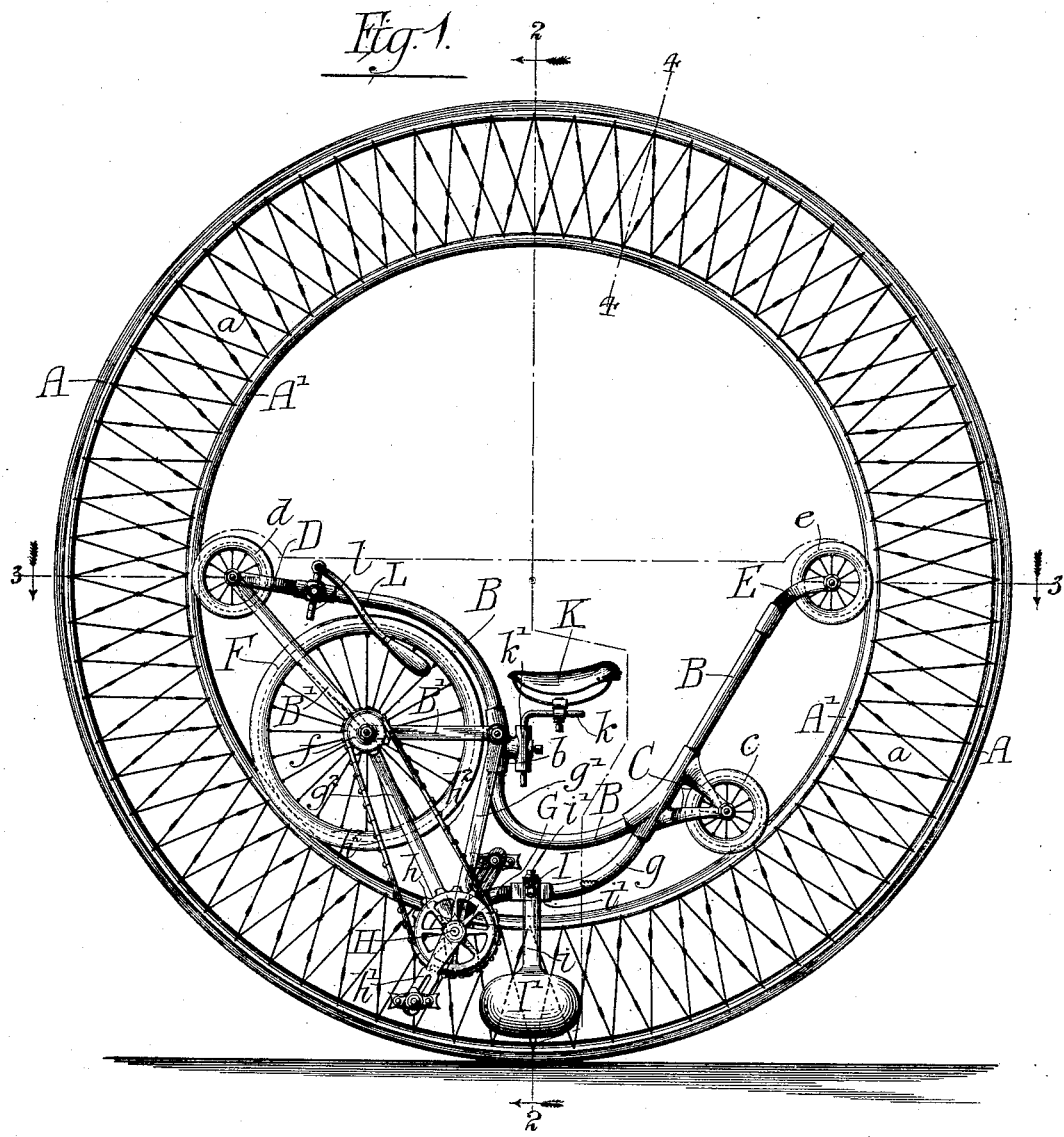
Figure 4:
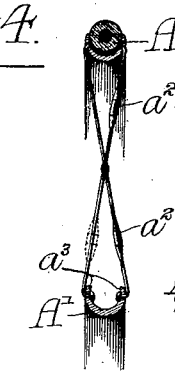

In the accompanying drawings, Figure 1 is a side elevation of a unicycle embodying my improvements. Fig. 2 is a vertical transverse section of the same on the line 2 2 of Fig. 1. Fig. 3 is a horizontal transverse section, on the line 3 3 of Fig. 1, of the wheel shown in Fig. 4. Fig. 4 is an enlarged sectional view on line 4 4 of Fig. 1. Figs. 5 and 6 illustrate modifications in the inner rim and drive-wheel.

In constructing my improved unicycle I employ a compound rim consisting of an outer member or rim A, of either hollow or V section, designed to receive the rubber tire, which travels in contact with the ground, and an inner rim or endless track A', suspended concentrically within the outer rim A by means of spokes $a$, of steel wire. In order that the spokes may have the necessary spread to prevent a buckling or warping of the rims in use, they may be crossed from one edge of one rim to the opposite edge of the other, as shown in Figs. 1, 2, 3, and 4, though this is not essential, as practically the same result may be obtained by constructing one of the rims, preferably the inner or track rim A', of greater width than the other one and carrying the spokes from the center of said narrow rim to the edges of the wider one, as seen in Fig. 5, or this latter plan may be adopted when using the wide rims commonly employed with cushion or pneumatic tires without constructing the rims of different widths, as a spread of two inches in twelve or fifteen would be sufficient to attain the end sought. In spoking the rim either direct radial spokes may be used or those commonly known as "tangent" spokes, and in either case the spokes may be headed into one rim and adjustably secured to the other by means of the usual spoke-nipple $a'$, or the spokes may be made in two parts, each of which is headed into the respective rims, the meeting ends being oppositely threaded and united by a turnbuckle $a^2$. These methods of securing the spokes, though well known, are illustrated in the detail, Figs. 4, 5, and 6.

To avoid torsional strain on the outer rim A and the accumulation of dirt, and also to render the spokes less liable to injury from contact with other objects, I prefer to connect them at their outer ends to the center of the outer rim A, their inner ends being secured to the opposite edges of the inner rim to give the required spread.

To secure strength, rigidity, and lightness, I prefer to use a modified form of the "hollow rim" for the track A', and this also affords facilities for connecting the inner ends of the spokes, as they may be passed through the side flanges $a^3$, projecting beyond the hollow section of the rim.

Within the track-rim A' is mounted a stiff frame consisting of a "backbone" B, to which forked brackets C, D, and E are secured, and journaled between the outer ends of the forks of these brackets are grooved guide-wheels $c$, $d$, and $e$, which travel on the track-rim A' and support the frame and its accompanying parts within it. These guide-wheels are arranged $d$ and $e$ on opposite sides of the track and at or a little above a horizontal line drawn across the axis of the rim and $c$ at a point intermediate between the wheel $e$ and the base of the rim. Forward of the guide-wheel $c$ the frame is arched to accommodate a drive-wheel F, the ends of the axle of which are mounted in bearings carried by a bifurcated frame B', secured at its front end to the forks of the bracket D and at its rear end to a forked sleeve b, fixed to the arch of the backbone, the bifurcated frame B' being so proportioned that the periphery of the wheel F will bear with frictional driving pressure on the track-rim at a point forward of the vertical center of the rim and at about the same distance from said vertical center as the guide-wheel c, the frame being thus supported within the rim at four points. The grooves of the driving and guide wheels are preferably lined with rubber, leather, or some other substance that will afford frictional hold and at the same time deaden sound.

Extending forward and downward from the bracket C is the rear support g for a forked bracket G, which straddles the rim A', the ends of the fork being connected with supports g', the upper ends of which are secured to opposite sides of the sleeve b of the backbone. Brace-rods $g^2$ extend from the ends of the fork of bracket G to the lower angle of the bifurcated frame B'. The ends of the fork are provided with bearings, in each of which is journaled a stub-shaft H, carrying a sprocket-wheel h and the usual crank h', the sprocket-wheels being connected by chains $h^2$ with sprocket-wheels ff, one of which is secured to or forms part of each end of the hub of wheel F.

Upon the rear support of the bracket G is mounted an adjustable yoke or sleeve I, from the opposite sides of which depend rigid arms i, carrying weights I' at their lower ends, which are positioned as near to the ground as is possible without endangering their contact therewith when the machine is inclined, as in running curves. The sleeve is fitted with set-screws i' to lock it after adjustment to the front or rear and against turning on the support, and to provide more perfectly against this latter contingency the support may be provided with a longitudinal spline to engage a groove in the sleeve.

The saddle K is mounted on a post or L-rod k, vertically adjustable in a socket k', carried by the sleeve b; and the handle-bar L is provided centrally with a depending stud l, which is adjustably seated in a socket near the forward end of the backbone.

In Figs. 1 to 4 of the drawings I have shown the inner or track rim A' with a convex inner surface and the guide and driving wheels of the frame with grooved peripheries adapted to embrace the rim; but I contemplate in some instances arranging the rim A' in the manner shown in Fig. 6. In this instance the concave or grooved side of the rim A' is arranged to face inward to receive a rubber tire (preferably of the cushion or pneumatic type) upon which said grooved guide and driving wheels may run. By this arrangement I secure all the advantages to be derived from the use of pneumatic tires without the liability of the tire being punctured from contact with nails protruding from the flooring of bridges or sharp obstacles in ordinary roadways. I also contemplate arranging such rim A' with its grooved side facing inward to form a grooved track and providing the guide and driving wheels with pneumatic tires running in said grooved track, thus achieving the same end as stated above, but effecting a saving in the cost of repairs, as one of the tires of a small wheel, if injured, could be replaced at much less cost than a tire of the required diameter to fit the track-rim. The drawing Fig. 6 also serves to illustrate the latter construction.

In the operation of wheels of the described type there is great advantage in maintaining the center of gravity as much below the horizontal center of the rims as is possible, thus decreasing the tendency of the driving-wheel to climb the rim when obstructions are met or grades to be ascended and facilitating the maintenance of the balance of the wheel vertically.

By the arrangement of the pedals and crank-axles below the inner rim, as I have heretofore described, I am enabled to locate the saddle and the operating parts carried by the frame, as well as the frame itself, below the horizontal center of the rims, thus greatly increasing the rider's effective force in propelling the wheel, as the greater part of his weight when mounted will also be below the horizontal center of the rims. The weights I' also are given their position on each side of the rims and below the inner one to give greater counterbalancing effect and increase the rider's power to mount obstructions and grades, as the tendency of the driving-wheel to climb the track-rim is thereby much lessened.

I claim as my invention—

1. The combination, with inner and outer connected rims, of a frame supported within the inner rim and provided with a driving-wheel, separate crank-shafts mounted on the frame at points exterior to the inner rim and provided with cranks, and driving mechanism connecting the crank-shafts with the driving-wheel, embracing a driving-chain and sprockets for each crank-shaft, substantially as described.

2. The combination, with inner and outer connected rims, of a frame supported within the inner rim and provided with a driving-wheel and with a forked bracket extending beyond the inner rim, stub-shafts journaled to the lower ends of the fork and each carrying a sprocket-wheel and crank, sprockets on each end of the hub of the drive-wheel, and chains extending around said sprocket-wheels, substantially as described.

3. The combination, with the inner and outer connected rims, of a frame supported within the inner rim and provided with driving and guide wheels running on said inner rim, driving mechanism connected with the driving-wheel, and weights secured to the lower part of the frame and extending below the inner rim, substantially as described.

4. The combination, with the inner and outer connected rims, of a frame provided with driving and guide wheels running upon the inner rim, driving mechanism connected with the driving-wheel, and weights adjustably secured to the lower part of the frame and extending below the inner rim, substantially as described.

5. The combination, with the outer and inner connected rims, of a frame provided with driving and guide wheels running upon the inner rim, a sleeve or yoke attached to the frame and longitudinally adjustable thereon, and weights attached to said sleeve or yoke and located below and outside of the inner rim, substantially as described.

6. The combination, with the outer and inner connected rims, of a frame having driving and guide wheels running upon the inner rim, driving mechanism carried by the frame and connected with the driving-wheel, and a tire or tires, of rubber or other yielding substance, interposed between the said inner rim and the said driving and guide wheels, substantially as described.

7. The combination, with the outer and inner connected rims, said inner rim having a groove in its inner face, of a frame having grooved driving and guide wheels, driving mechanism carried by the frame and connected with the driving-wheel, and a cylindric tire or tires, of rubber or other yielding substance, interposed between the said inner rim and the said driving and guide wheels, substantially as described.

8. The combination, with an outer rim, of an inner rim suspended concentrically therein by two sets of spokes extending from rim to rim and inclined relatively to the radii of the wheel, the spokes of one set being arranged alternately with and at opposite angles to the spokes of the other set, whereby the rims may be maintained in the same plane, substantially as described.

In testimony that I claim the foregoing as my invention I affix my signature in presence of two witnesses.

JOHN RAWLE.

Witnesses:
C. A. NEALE,
IRVINE MILLER.